United States Patent [19]
Rabideau

[11] 3,918,192
[45] Nov. 11, 1975

[54] JIG-SPINNER FISH LURE

[76] Inventor: Phillip A. Rabideau, 201 Penhurst Drive, Pittsburgh, Pa. 15235

[22] Filed: Sept. 10, 1973

[21] Appl. No.: 395,767

Related U.S. Application Data

[63] Continuation of Ser. No. 280,442, Aug. 14, 1972, abandoned.

[52] U.S. Cl.................................. 43/42.17; 43/17.1
[51] Int. Cl.² ........................................ A01K 85/00
[58] Field of Search......................... 43/42.17, 42.19

[56] References Cited
UNITED STATES PATENTS

| | | | |
|---|---|---|---|
| 2,238,292 | 4/1944 | Schavey | 43/42.17 |
| 2,610,429 | 9/1952 | Thomas | 43/42.17 |
| 2,902,791 | 9/1959 | Woodley | 43/42.17 |
| 3,555,717 | 1/1971 | Gautsche, Jr. | 43/42.17 |
| 3,568,351 | 3/1971 | Perrin | 43/17.1 |

Primary Examiner—Robert Peshock
Assistant Examiner—Daniel J. Leach
Attorney, Agent, or Firm—Alex Mich, Jr.

[57] ABSTRACT

An artificial underwater fish lure is made of a flexible bead chain having an unbalanced dished spinner blade mounted thereon and an attached double hooked weighted body portion having a streamer extending and flaring out from a mounting in the body portion. The body portion has a flat base and each of the hooks extend upwardly from the base.

12 Claims, 6 Drawing Figures

JIG-SPINNER FISH LURE

This is a continuation of application Ser. No. 280,442 filed Aug. 14, 1972, now abandoned.

BACKGROUND OF THE INVENTION

The recreational or sport fisherman has available a wide variety of artificial fish lures that can be employed to attract and catch fish. Some artificial lures are designed to resemble natural bait, others are not. Some are surface lures, e.g., dry flies and surface plugs, specifically designed to stay on or at the surface. Others are underwater lures, designed to stay or operate below the water surface. Examples of the latter are streamers, underwater plugs, spoons, spinners and jigs. Spinners and jigs are among the most popular underwater lures and a wide variety of each is generally known and available.

A spinner is a fish lure having one or more metal blades which are rotated by hydrodynamic forces when the lure is retrieved after casting or when towed during trolling. The spinner blade may be unbalanced or asymmetrical, e.g., a dished egg, oval or other similarly shaped blade, or balanced or symmetrical e.g. a propeller shaped blade. Typically, the blade is mounted on a rigid shaft or wire by means of a ring or clevis so that the blade will rotate when retrieved. The rigid shaft has disadvantages both in casting (primarily with some loss in the accuracy of casts) and in the relatively high retrieval speed necessary to make the spinner rotate. Spinners typically also have a treble hook which either precludes their use for bottom fishing or substantially increases the likelihood of loss of the lure by snagging. Spinners also generally have a tendency to twist the line so that one must select and use a proper separate snap-swivel to avoid line twist.

A jig is an artificial lure which is not designed to have any particular action of its own when moved through the water without jigging, other than the breathing action of any streamer on the lure. Perhaps its action can be best described as straight action to distinguish it from spoons, plugs and the like. Although a spinner might be described as having straight action if one merely describes the retrieval path, it ignores the action of the designed movement of the rotating spinner itself. The jig usually has no such movement. In any event, jig lures are worked or moved through the water with a twitching or jerking motion induced by the action of the fisherman. This jerking motion is, of course, known as "jigging." In the extensive variety of jig lures, one of the most useful classes is the buck tail jig which has a body or head and a trailing streamer of feathers, nylon or animal hair (e.g., white deer tail or "bucktail"). Like most other jigs, a bucktail jig has a single hook molded into the head and an offset-eye, located on top of the body or head. The offset-eye is usually preferred to the nose-eye.

The trailing streamer has a breathing action or alternating contractions and expansions as the lure is jigged. The streamer is typically formed by surrounding a terminal portion of the head with rearwardly extending hair or other filaments and wrapping a string, thread or other material about the head and streamer filaments to hold the filaments in place. This is, of course, a time consuming assembly procedure. The single hook of the typical jig limits the likelihood of catching a fish compared to multiple hooks. While some jigs are designed for and are employed in a bottom-water fishing strategy known as jigging or bottom-bouncing, most jigs do not appear to be designed to land in an upright position to diminish the likelihood of snagging even the single hook. Because of the inherent difficulties of bottom fishing, other types of artificial lures are less effective than jigs and these too do not appear to be designed to effectively minimize the likelihood of snagging.

SUMMARY OF THE INVENTION

Accordingly, it is an object of this invention to provide an artificial fish lure that is a combination of a spinner and a jig which can be effectively employed in either of those modes, can be accurately cast, can be consistently cast or otherwise deposited on the bottom in a position which reduces the likelihood of snagging and thus make it particularly suited for bottom fishing, can be used without external aids to eliminate line twist, can be more easily fabricated and which will substantially increase both the convenience and likelihood of catching fish compared to lures having only one hook.

Briefly, the present invention accomplishes the foregoing objects by employing a spinner portion having an asymmetrically mounted dished blade spinner on a flexible bead chain which provides an inherent swivel. Attached to the flexible spinner portion is a jig portion having a double hook, a body with a flat bottom and a streamer or tail mounted in a pocket or cavity of the body and extending to or beyond the hooks. The hooks are angled upwardly from the flat portion of the body. The body portion is weighted so that the center of gravity lies between the eye and the shank of the hook and so that the lure will operate underwater rather than the surface of the water.

BRIEF DESCRIPTION OF THE DRAWINGS

For a better understanding of the invention, reference is made to the drawing, in which.

DESCRIPTION OF THE PREFERRED EMBODIMENTS

Figure 1:
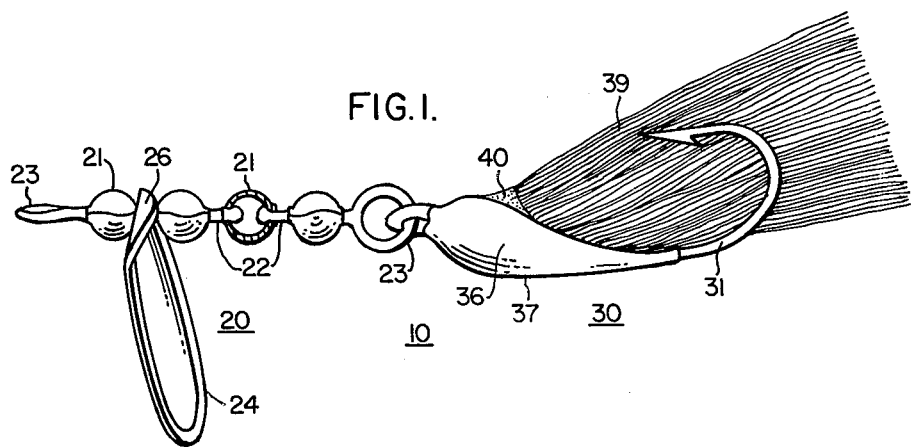
FIG. 1 is a side elevational view of the entire lure, with the lure in a horizontal or approximate retrieval position.

Referring now to FIG. 1 of the drawing, the artificial underwater lure 10 of this invention is a combination of the spinner portion 20 and the jig portion 30. Forming a part of the spinner portion is a flexible bead chain which is composed of a plurality of hollow balls 21 mounted on headed wire links 22. As shown in the broken part of FIG. 1, the balls 21 have holes on opposite ends of a center line therethrough which are somewhat smaller than the heads on the terminals of the links but larger than the wire diameter. Each ball acts as a swivel because it is free to rotate about its links. Headed eye links 23 are similarly inserted into the exterior holes of each of the terminal balls and the eyes are also free to rotate with respect to the balls. The headed wire links are typically no longer than the ball diameters and should, in any event, be sufficiently short and numerous to provide flexiblity in the chain. A dished egg or spoon shaped blade 24 is asymmetrically mounted for rotation about a link between balls of the chain. The convex portion of the blade should face the lineside of the lure and the concave portion should face the rear or jig portion of the lure.

Figures 2A, 2B:
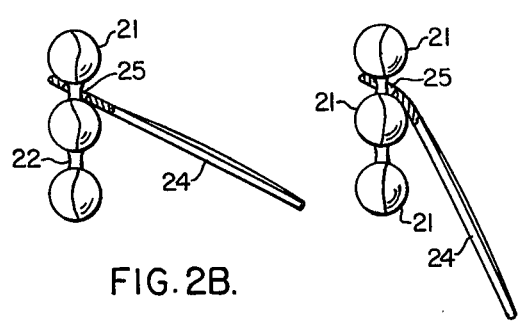
FIG. 2A is a detail side elevational view of the spinner blade mounted on the flexible bead chain but with the bead chain in a vertical position.
FIG. 2B is a detail side elevational view of an alternate spinner blade.

A hole 25, shown in FIGS. 2A and 2B, adjacent one end of the blade, because it is substantially larger than the wire link and smaller than the ball diameter, permits the rotation of the blade on the bead chain but precludes axial movement along the chain. A short end portion 26 of blade, may be bent so that the blade is slightly inclined toward the jig body when hanging freely from a tautly held horizontally positioned chain as shown in FIG. 1. When tautly held in a vertical position, as shown in FIG. 2A, the opposite or lowermost (as illustrated) end of the blade will be closer to the vertical because of the angled bend. This latter feature permits the blade to assume a position more closely aligned to the chain during the casting of the lure where it will offer less aerodynamic resistance and consequently greater accuracy. When retrieved or otherwise drawn through the water, the blade will nonetheless spin or rotate because of the hydrodynamic forces thereon. The smaller angle between the faces of the blade so bent is about 130°. It should be understood that the unbalanced spinner blade may have various finishes, bright or dull, smooth or rough, as one may desire. While the illustrated steel egg shaped blade with a slight dish and flat edge as shown in FIGS. 1, 2A and 2B is preferred, other similar dished blade shapes may be employed, so long as they are asymmetrically mounted. An alternate acceptable blade may be made without the described angle bend. This alternate is shown in FIG. 2B. When the bead chain is held vertically taut the blade should incline downwardly. Propeller blades, clevis and ring mounted blades, and rigid shaft mountings are, however, not suitable in accordance with this invention.

The jig body portion 30 (FIG. 1) of the lure has as an essential feature the double hook 31 which may, because of convenient availability have a split or open shank 32 (FIG. 3) and the typical eye 33, barb 34 and point 35. A relatively short portion of the shank adjacent the eye is bent upwardly from a flat position toward the points of the hooks so that the eye is located above the shank. The tip of the eye may be parallel to the lower portion of the shank. A line drawn from the eye toward the curve of the hook and parallel to the lower portion of the shank will intersect the central curved portion of the hook. A weighted body portion 36, preferably lead or other metal, is cast about the hook shank and inclines generally from the eye to the shank so that the hook is left open. The body has a flat planar base 37 so that the body can come to rest on the flat base. The center of gravity of the jig portion of the lure is advantageously located below the eye 33 and as close to the lowermost portion of the shank as possible. The body weight is concentrated behind the eye and adjacent or contiguous to the lowermost part of the shank. For that reason, the metal body is provided with a central dished cavity or pocket. That cavity is also designed to accept or seat the apex of a flared or conically shaped trailing streamer 39 which extends at least to the end of the hooks and preferably a short distance beyond. The filamentatious material for the streamer may be animal hair or synthetic filaments such as nylon, polyester, etc. Flared to form a broad tail and compacted and bound together at the apex, the compacted apex is seated in the cavity 38 and bonded thereto with a water resistant adhesive 40. Epoxy resin adhesives are particularly suitable and may be formulated to cure rapidly at room temperature. If desired, the metal body may be dipped in a vinyl plastisol or other resinous coating material to provide a protective and/or decorative coating.

While the foregoing description of the body is directed to a metal body which may be convenient and economical in relatively small quantity production, it should be understood that the body may, particularly in larger quantities, be cast or molded more economically from plastic or synthetic resins. Polyvinyl chloride, polyvinyl fluoride, polycarbonates, etc., may be employed. The plastics would, of course, have a lower specific gravity than metals but the desired weight and center of gravity or weight distribution of the body can be attained with a heavy metal insert at or adjacent to the lowermost portion of the shank and behind the eye.

Figure 5:
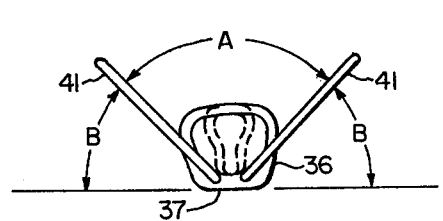
FIG. 5 is a rear view of the body of the jig portion of the lure.

Referring now to FIG. 5 in particular, it should be noted that the smaller included angle A between the two curved portions 41 of the hooks is about 90° and that each hook forms an angle B, about a 45° angle, with the flat base 37, as illustrated. The angles B should be about equal and no smaller than about 30°, in order to provide a flat based lure that will resist bottom snagging and will consistently come to rest on the flat base when cast.

Figure 3:
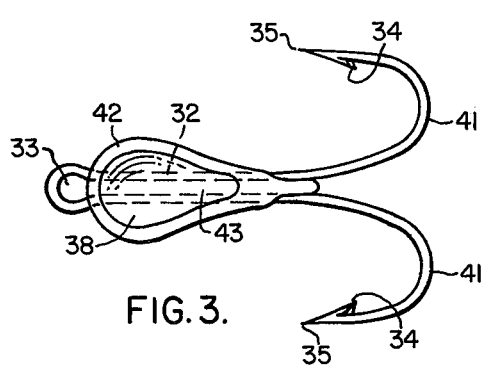
FIG. 3 is a top view of the body of the jig portion of the lure.
Figure 4:
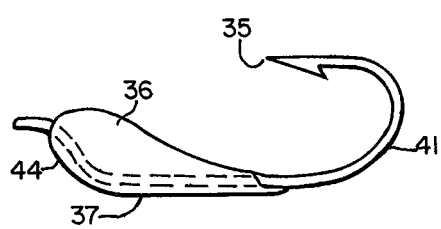
FIG. 4 is a side view of the body of the jig portion of the lure.

Although it is not essential to the basic advantages of this invention, further advantages are believed to attend the basic shape of the body portion of the jig lure, i.e., the relatively broad anterior portion 42 and narrow posterior portion 43 most apparent in FIG. 3 and the upwardly angled anterior forwardmost surface 44 most apparent in FIG. 4 are believed to further reduce the likehood of snagging and to provide a stable relatively horizontal position during retrieval.

While I do not wish to be bound by any particular theory, the heretofore described assembly of flexible bead chain with an integral unbalanced spinner blade, all attached to the weighted double hooked body with the streamer mounted astride the body and extending rearwardly to or beyond the hooks, has a unique facility for consistently landing in an upright position when cast into water. I believe that several features contribute to this facility, particularly the flexible bead chain, the weighted, flat based body and the upwardly angled double hooks. The flared streamer may also add to the consistency of such landing. Some of these features also contribute to the unique ability of the lure to be fished along the bottom with infrequent snagging, even when allowed to come to rest on the bottom before retrieving. The spinner blade is believed to contribute to the infrequent snagging. The lure can, of course, be employed in either a spinning or jigging mode (especially bottom bouncing) to attract and catch fish. The spinner blade will rotate in either mode. The spinner blade will rotate at a broad range of retrieval speeds, whether uniformly retrieved or jigged.

The jig portion of the lure can be made in various sizes and weights depending on the fish species being sought. Similarly, the flexible bead chain and spinner blade can be varied in size and weight. The bead chain and double hook may be generally substantially equal in length. The length of the spinner blade may be normally greater than the width and the length may be substantially equal to the length of the bead chain. The spinner, jig body and streamer can be variously colored. Weed guards, although not essential, may be added to the hooks, if desired.

The lure as described may also be employed in a trolling mode with the heretofore described advantages. In this mode, as well as the retrieval modes heretofore described, the lure will maintain a substantially upright position as illustrated in FIG. 1. The rotating spinner blade will also aid in preventing hang-ups of the lure.

I claim:
1. A fish lure comprising:
a flexible bead chain, a dished blade asymmetrically attached to said chain and adapted to rotate thereabout when drawn through water;
an assembly, attached to said chain, of
1. only two hook members having an eye, shank and upwardly curving hooks, an end portion of the shank also extending upwardly so that said eye is located above the remaining portion of the shank,
2. a weighted body member having a base and a cavity above said base said body member secured to the shank of said hook members so that the body weight is concentrated behind said eye and adjacent or contiguous to said shank, and
3. a filamentatious streamer flaring outwardly from an apex, said apex secured in said body cavity, said streamer extending to the curving hooks of said hook members.
2. The lure of claim 1 wherein said flexible bead chain comprises a plurality of hollowed balls and headed link wires, said hollowed balls encompassing a link head, and wherein means within one end of said blade encompasses a link between adjacent balls to permit rotation of the blade about the link, the axial movement of the blade being limited by the adjacent balls.

3. The lure of claim 2 wherein a short end portion of the blade is bent so that the remaining larger portion is inclined toward the body member when the chain is held in a taut horizontal position.
4. The lure of claim 2 wherein said blade means comprises a hole in said blade.
5. The lure of claim 1 wherein the curved hooks of the hook members define an angle of at least about 30° with the base of the body member.
6. The lure of claim 5 wherein said angle is about 45°.
7. The lure of claim 1 wherein said body member has a broad anterior portion and a narrower posterior portion.
8. The lure of claim 7 wherein said anterior portion is angled upwardly from the shank of the hooks to the eye of the hooks.
9. The lure of claim 2 wherein headed eye links are encompassed by terminal balls of the bead chain.
10. The lure of claim 1 wherein the bead chain length and assembly length are about equal.
11. A fish lure comprising a flexible bead chain of a plurality of hollowed balls and headed link wires wherein a hollowed ball encompasses link heads, said bead chain adapted at one end for attachment to a line, a dished blade having convex and concave portions asymmetrically attached to said chain so that the convex portion faces the line end of the chain and the concave portion faces the opposite direction, said blade having a hole extending therethrough and adjacent one end thereof, the hole being larger than the link, smaller than the ball diameter and encompassing a link between adjacent balls to provide the asymmetric attachement and providing rotation when drawn through water, an assembly attached to another end of the chain comprising a weighted body member and a hook member.
12. The lure of claim 11 wherein said assembly comprises only two hook members, said body member secured to said hook members and a filamentatious streamer flaring outwardly from an apex, said apex secured at said body member and extending to said hook members.

* * * * *